United States Patent
Sherman et al.

(10) Patent No.: US 8,032,259 B2
(45) Date of Patent: Oct. 4, 2011

(54) BI-DIRECTIONAL POWER CONTROL

(75) Inventors: Itay Sherman, Hod Hasharon (IL);
Eran Miller, Givataim (IL)

(73) Assignee: Google Inc., Mountain View, CA (US)

( * ) Notice: Subject to any disclaimer, the term of this patent is extended or adjusted under 35 U.S.C. 154(b) by 340 days.

(21) Appl. No.: 12/263,560

(22) Filed: Nov. 3, 2008

(65) Prior Publication Data

US 2009/0199025 A1    Aug. 6, 2009

(30) Foreign Application Priority Data

Feb. 6, 2008    (WO) ................. PCT/IL2008/000164

(51) Int. Cl.
*G06F 19/00* (2011.01)
(52) U.S. Cl. ........................................ 700/286; 713/310
(58) Field of Classification Search ................. 700/286; 710/15–19, 64, 72–74, 300, 104; 713/310
See application file for complete search history.

(56) References Cited

U.S. PATENT DOCUMENTS

| | | | |
|---|---|---|---|
| 5,625,673 | A | 4/1997 | Grewe et al. |
| 5,628,055 | A | 5/1997 | Stein |
| 5,809,115 | A | 9/1998 | Inkinen |
| 5,893,037 | A | 4/1999 | Reele et al. |
| 5,907,815 | A | 5/1999 | Grimm et al. |
| 6,188,917 | B1 | 2/2001 | Laureanti |
| 6,201,867 | B1 | 3/2001 | Koike |
| 6,243,578 | B1 | 6/2001 | Koike |
| 6,477,357 | B1 | 11/2002 | Cook |
| 6,516,202 | B1 | 2/2003 | Hawkins et al. |
| 6,640,113 | B1 | 10/2003 | Shin et al. |
| 6,690,947 | B1 | 2/2004 | Tom |
| 6,798,647 | B2 * | 9/2004 | Dickie ..................... 361/679.04 |
| 6,898,283 | B2 | 5/2005 | Wycherley et al. |
| 6,907,264 | B1 | 6/2005 | Sterkel |
| 6,961,237 | B2 * | 11/2005 | Dickie ..................... 361/679.04 |
| 6,999,792 | B2 | 2/2006 | Warren |
| 7,085,542 | B2 | 8/2006 | Dietrich et al. |
| 7,194,285 | B2 | 3/2007 | Tom |
| 7,266,391 | B2 | 9/2007 | Warren |
| 7,477,919 | B2 | 1/2009 | Warren |

(Continued)

FOREIGN PATENT DOCUMENTS

EP    1871075 A1    12/2007

(Continued)

*Primary Examiner* — Kidest Bahta
(74) *Attorney, Agent, or Firm* — Soquel Group LLC

(57) ABSTRACT

An electrical circuit for bi-directional power control between two devices, including a first battery-operated device, including a first battery for providing a source of power to the first battery-operated device, a first power management subsystem connected to the first battery, to power on and power off components of the first battery-operated device in response to a first wakeup event, $WE_1$, and a first on/off button for generating $WE_1$, a second battery-operated device, including a second battery for providing a source of power to the second battery-operated device, a second power management subsystem connected to the second battery, to power on and power off components of the second battery-operated device in response to a second wakeup event $WE_2$, a second on/off button for generating $WE_2$, and a switch for generating $WE_1$ simultaneously when the second on/off button generates $WE_2$, and circuitry including a single connection inter-connecting the first power management subsystem, the first on/off button, the second power management subsystem, the second on/off button, and the switch for generating $WE_1$.

12 Claims, 4 Drawing Sheets

U.S. PATENT DOCUMENTS

| | | |
|---|---|---|
| 7,515,937 B2 | 4/2009 | Lee |
| 2002/0090980 A1 | 7/2002 | Wilcox et al. |
| 2002/0151327 A1 | 10/2002 | Levitt |
| 2004/0233930 A1 | 11/2004 | Colby, Jr. |
| 2004/0268005 A1 | 12/2004 | Dickie |
| 2005/0159184 A1 | 7/2005 | Kerner et al. |
| 2005/0202859 A1* | 9/2005 | Johnson et al. ............ 455/575.7 |
| 2006/0003804 A1 | 1/2006 | Liu |
| 2006/0105722 A1 | 5/2006 | Kumar |
| 2006/0190321 A1 | 8/2006 | Martins Nicho et al. |
| 2006/0241353 A1 | 10/2006 | Makino et al. |
| 2007/0004450 A1 | 1/2007 | Parikh |
| 2007/0018957 A1 | 1/2007 | Seo |
| 2007/0079030 A1 | 4/2007 | Okuley et al. |
| 2007/0161404 A1 | 7/2007 | Yasujima et al. |
| 2007/0288583 A1 | 12/2007 | Rensin et al. |
| 2008/0009325 A1 | 1/2008 | Zinn et al. |
| 2008/0040354 A1 | 2/2008 | Ray et al. |
| 2008/0140886 A1 | 6/2008 | Izutsu |

FOREIGN PATENT DOCUMENTS

| | | |
|---|---|---|
| WO | 9421058 A1 | 9/1994 |
| WO | 0059247 A1 | 10/2000 |
| WO | 0186922 A1 | 11/2001 |
| WO | 03103174 A1 | 12/2003 |

* cited by examiner

BI-DIRECTIONAL POWER CONTROL

FIELD OF THE INVENTION

The field of the present invention is power management and control for electronic devices.

BACKGROUND OF THE INVENTION

Today's mobile devices are designed to optimize their power consumption, and specifically to avoid power loss during standby or shutdown. Generally, silicon integrated circuits (ICs) have significant current leakage, which is consumed when they are connected to a power source, even if they are not operational. To mitigate the leakage, mobile devices include a power management IC that controls the power to other ICs in the device, and cuts off power to the other ICs when the device is in standby or shutdown mode. Detection of a wakeup event by the power management IC, serves to power the device on or off. A wakeup event is either a button press and release, or a switch being closed and released thereby changing its logical level from 1 to 0 and back to 1.

SUMMARY OF THE DESCRIPTION

Aspects of the present invention relate to a mobile communication card which connects to another electronic device, where the other electronic device may be a host device that interoperates with the communication card, or a jacket for the communication card, the jacket being a passive device that does not operate independently of the communication card. A single line of a connector between the communication card and the jacket/host suffices to enable the communication card to turn the jacket/host on and off, and to enable the jacket/host to turn the communication card on and off. The same line is used for the communication card to generate wakeup events to power the jacket/host on or off, and for the jacket/host to generate wakeup events to power the communication card on or off. A wakeup event is either a button press and release, or a switch being closed and released thereby changing its logical level from 1 to 0 and back to 1.

There is thus provided in accordance with an embodiment of the present invention an electrical circuit for bi-directional power control between two devices, including a first battery-operated device, including a first battery for providing a source of power to the first battery-operated device, a first power management subsystem connected to the first battery, to power on and power off components of the first battery-operated device in response to a first wakeup event, $WE_1$, and a first on/off button for generating $WE_1$, a second battery-operated device, including a second battery for providing a source of power to the second battery-operated device, a second power management subsystem connected to the second battery, to power on and power off components of the second battery-operated device in response to a second wakeup event $WE_2$, a second on/off button for generating $WE_2$, and a switch for generating $WE_1$ simultaneously when the second on/off button generates $WE_2$, and circuitry including a single connection inter-connecting the first power management subsystem, the first on/off button, the second power management subsystem, the second on/off button, and the switch for generating $WE_1$.

There is further provided in accordance with an embodiment of the present invention an electrical circuit for bi-directional power control between two devices, including a mobile communication card, an electronic device that connects to the communication card, the electronic device being either (i) a host device that operates independently of the communication card and also interoperates with the communication card, or (ii) a jacket for the communication card, wherein the jacket is a passive device that does not operate independently of the communication card, and circuitry connecting the mobile communication card with the electronic device, including a card on/off button for the mobile communication card, a device on/off button for the electronic device, and a switch, wherein the circuitry uses a single connection line connecting the communication card, the electronic device, the card on/off button, the device on/off button, and the switch, to enable (i) the card on/off button to power the communication card on and off, (ii) the device on/off button to power the electronic device on and off, and (iii) the electronic device to simultaneously power the communication card on and off via the switch when the electronic device is powered on and off by the device on/off button.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to power management and control between two connected electronic devices. Using special circuitry, each device is able to turn the other device on and off, by generating wakeup events at one device to power the other device on or off, over a single line of a connector.

Figure 1A:
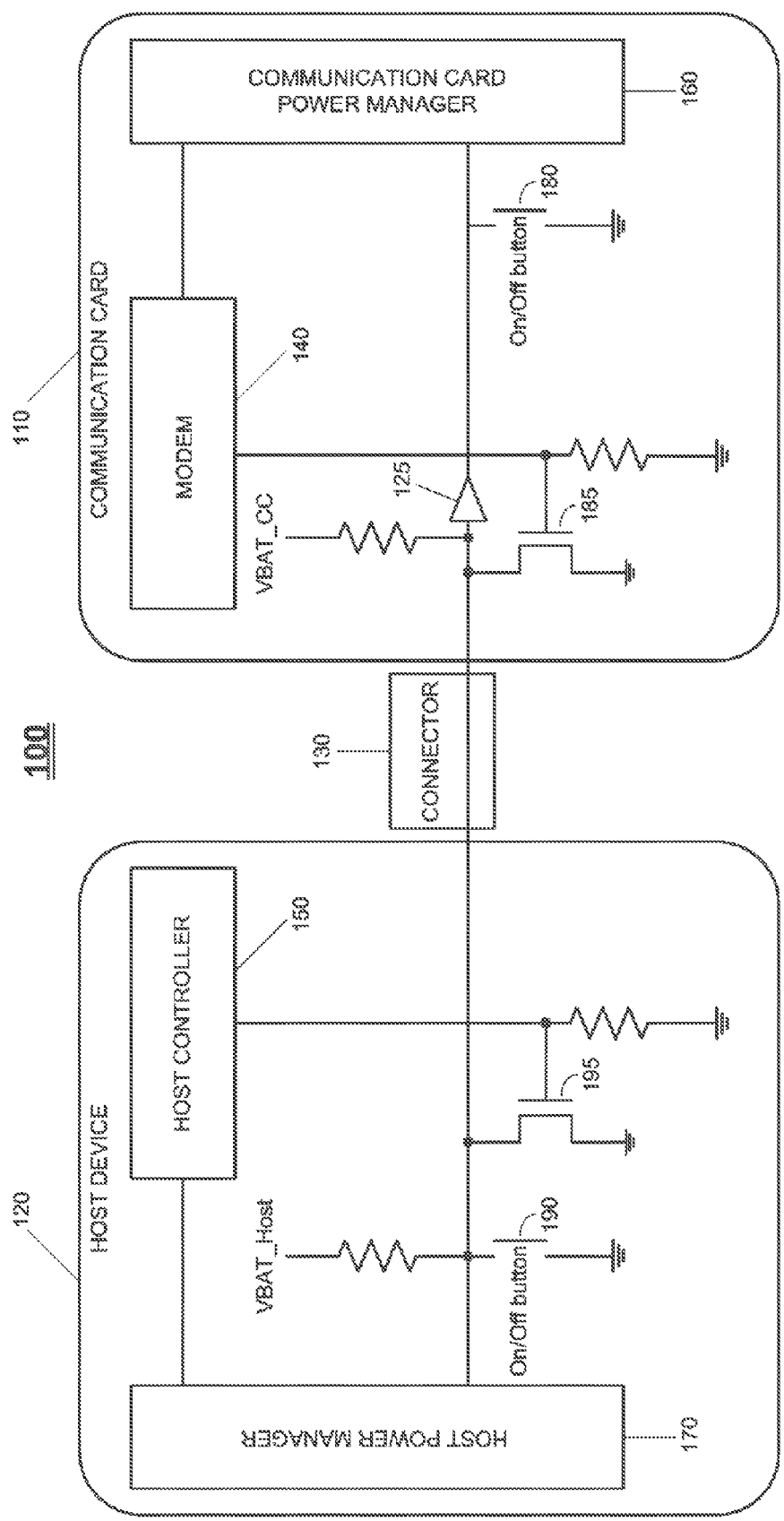
FIGS. 1A and 1B are simplified diagrams of circuits that provide bi-directional power control, in accordance with an embodiment of the present invention.
Figure 1B:
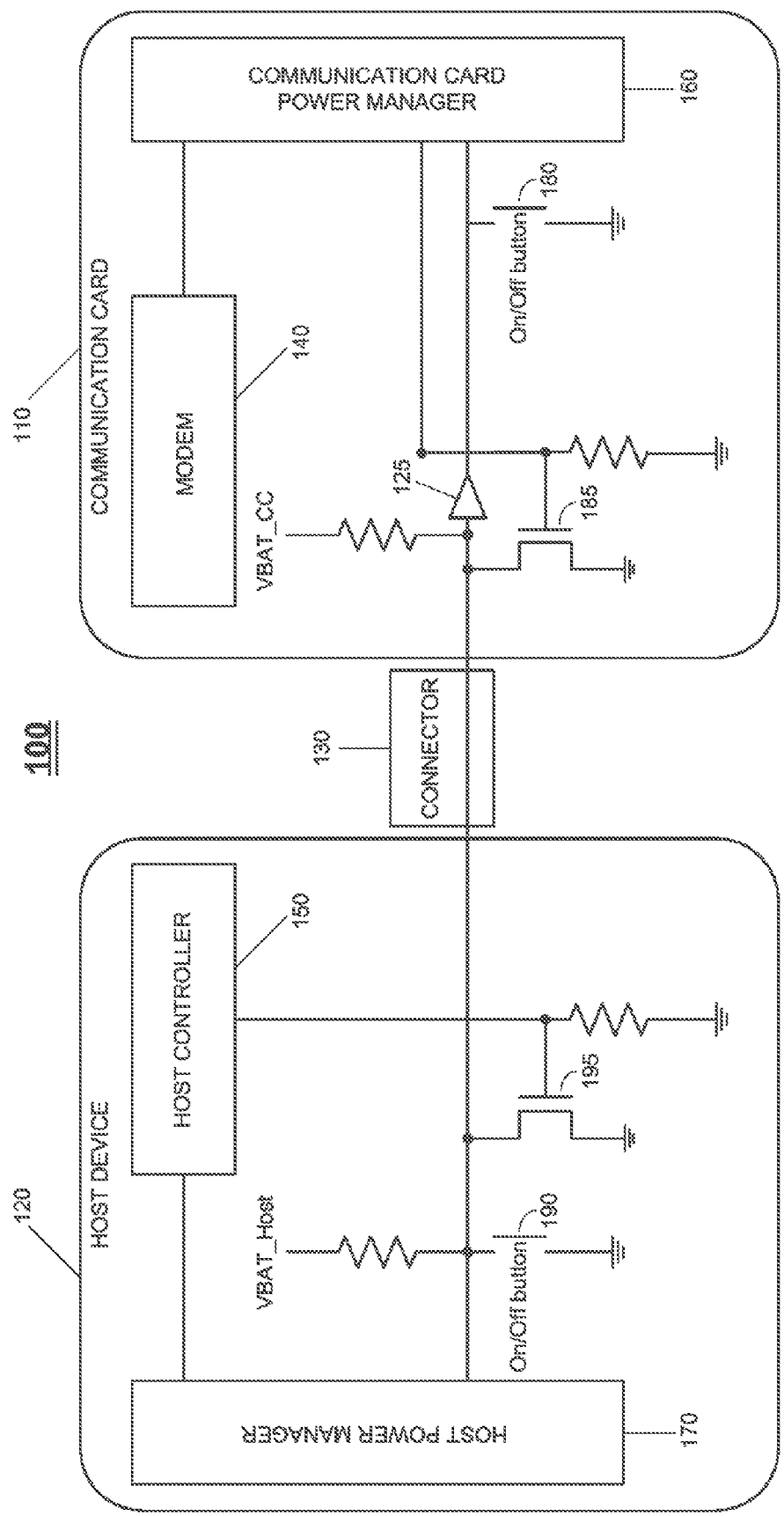

Reference is now made to FIGS. 1A and 1B, which are simplified diagrams of circuits 100 that provide bi-directional power control, in accordance with an embodiment of the present invention. Shown in FIGS. 1A and 1B is a communication card 110 connected to a device 120 via a dedicated connector 130. Communication card 110 is a mobile communication device that includes a modem 140. Communication card 110 attaches to device 120 via connector 130.

Figure 2:
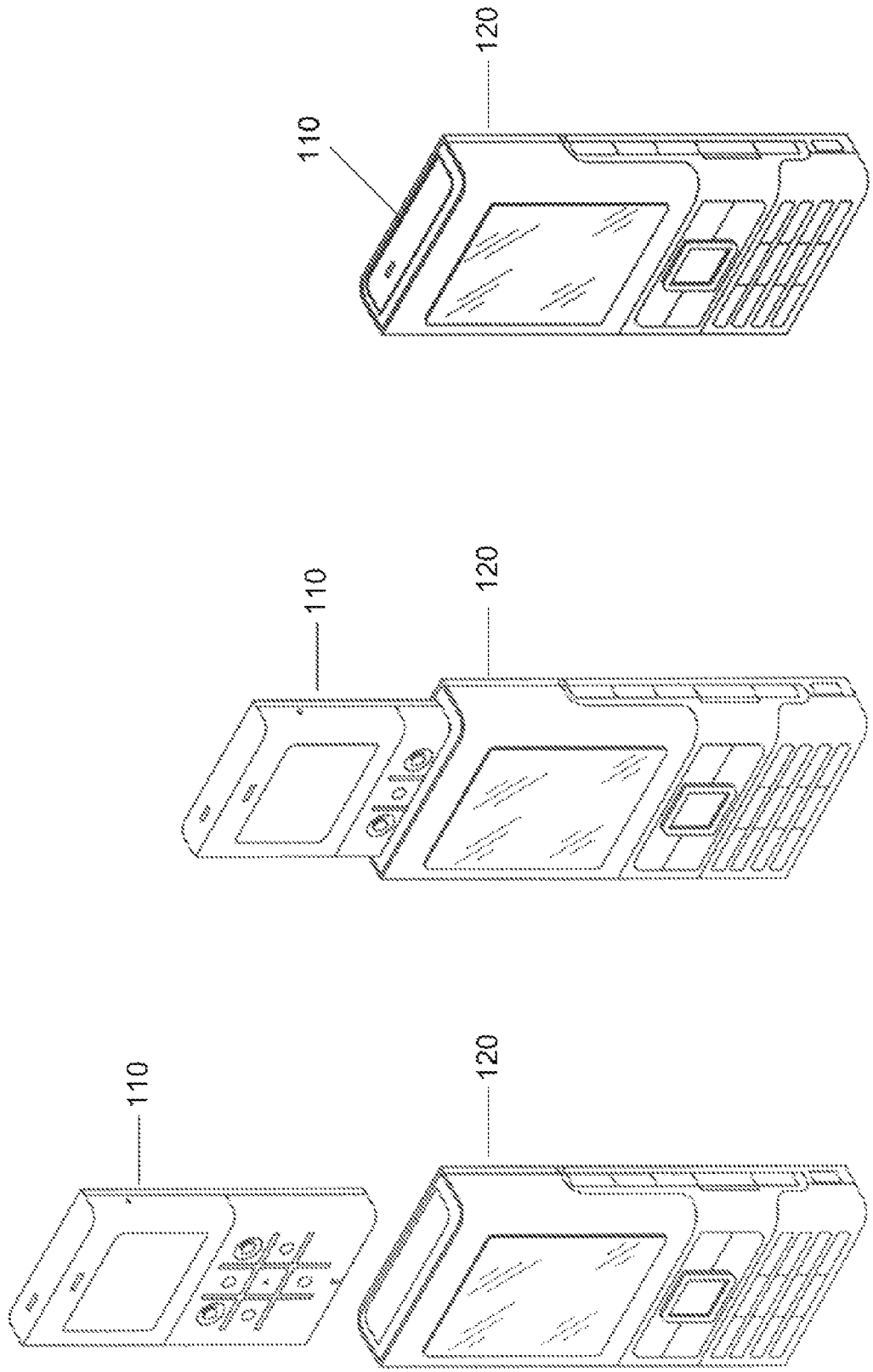
FIG. 2 is an illustration of communication card being inserted into a jacket, in accordance with an embodiment of the present invention.

Device 120 may be a passive device, referred to as a "jacket", which does not operate independently of communication card 110. In this regard, reference is now made to FIG. 2, which is an illustration of communication card 110 being inserted into a jacket 120, in accordance with an embodiment of the present invention.

Figure 3:
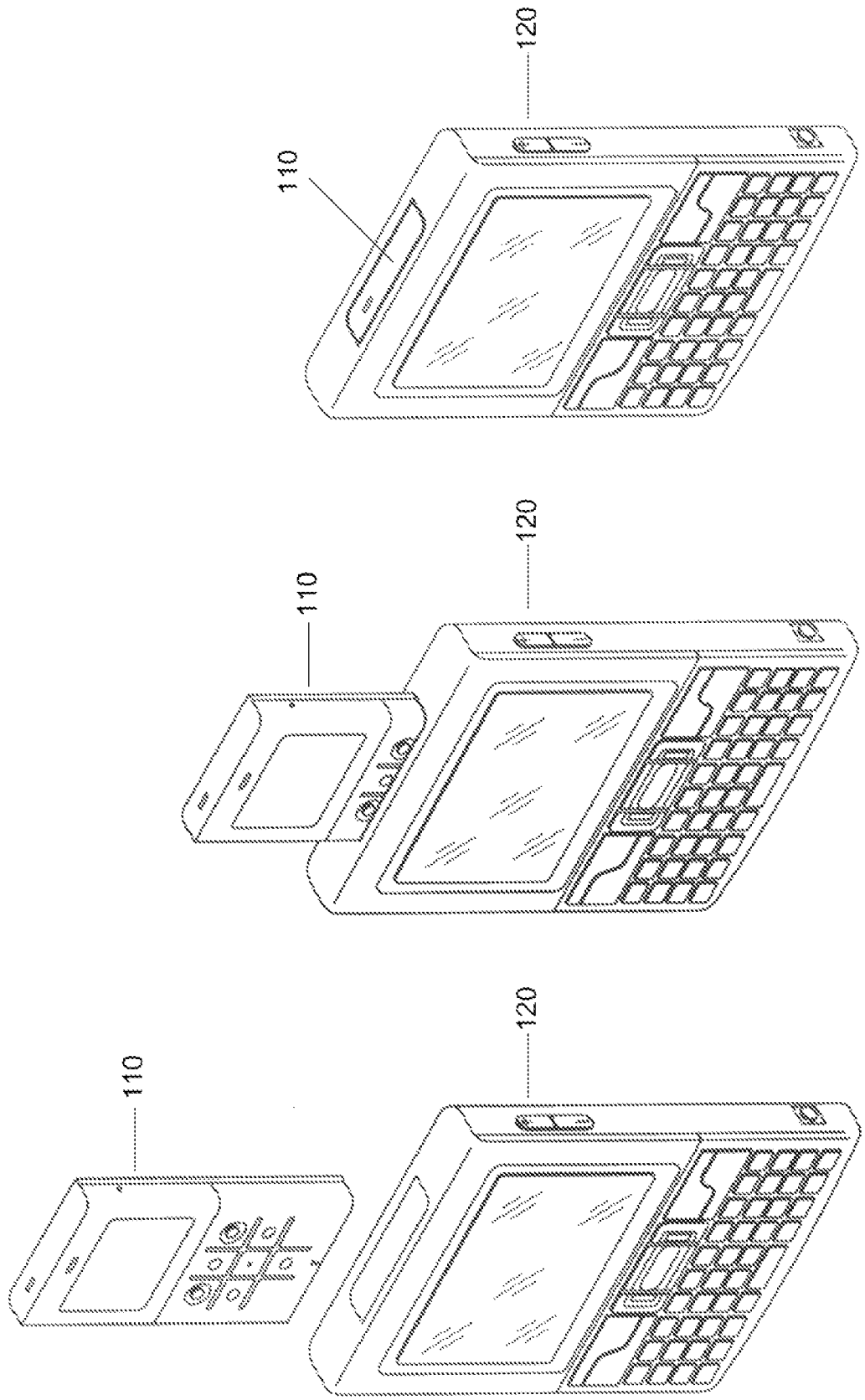
FIG. 3 is an illustration of communication card being inserted into a host, in accordance with an embodiment of the present invention.

Device 120 may alternatively be an active device, referred to as a "host", which has its own controller 150 and can operate independently of communication card 110. In this regard, reference is now made to FIG. 3, which is an illustration of communication card 110 being inserted into a host 120, in accordance with an embodiment of the present invention. The devices 120 shown in FIGS. 1A and 1B are host devices, but it will be appreciated by those skilled in the art that the circuits of FIGS. 1A and 1B also apply to jacket devices.

In an embodiment of the present invention, communication card 110 and host 120 are battery-operated devices, and have their own batteries for power. Power sources for communication card 110 and host 120 are designated by VBAT_CC and VBAT_Host, respectively, in circuit 100. Typical voltages for the batteries range from 4.2V for a fully charged battery to 2.8V-3.2V for a low battery, depending on system characteristics. Circuit 100 uses an optional voltage level shifter 125 to control the potential voltage gap between power sources VBAT_CC and VBAT_Host. One of the device batteries may be fully charged at 4.2V, for example, and the other may be at the low range of 3.2V.

Voltage level shifter 125 is powered from VBAT_CC, and its output level is based on VBAT_CC. Specifically, logical bit 1 corresponds to an output of VBAT_CC, and logical bit 0 corresponds to an output level of zero voltage. Voltage level shifter 125 also manages I/O levels of communication card 110, which may differ from the level VBAT_CC.

Circuit 100 includes grounds to protect the I/O units of the two devices from exposure to a high supply voltage, and to protect the devices' power sources from being shorted to one another.

Communication card 110 and host 120 are assumed to have respective power management ICs 160 and 170 that power them on and off when wakeup events occur. Additionally, a single line of connector 130 between communication card 110 and host 120 enables each device to generate wakeup events to power the other device on and off.

Communication card 110 and host 120 may be powered on and off independently; i.e., communication card 110 is able to be turned on when host 120 is turned on or off, and host 120 is able to be turned on when communication card 110 is turned on or off. Moreover, circuit 100 of FIG. 1 enables communication card 110, when it is turned on, to turn host 120 on and off; and enables host 120, when it is turned on, to turn communication card 110 on and off.

According to an embodiment of the present invention, host 120 includes an internal watchdog timer, which is used to turn on communication card 110 after a predetermined period of time.

Circuit 100 includes two on/off buttons, 180 and 190, and two on/off switches, 185 and 195, which cause each of communication card 110 and host 120 to power the other on or off. Buttons 180 and 190 are physical buttons that can be activated by a user.

Switches 185 and 195 are electronic switches that are inaccessible to the user. Instead, as shown in FIG. 1A, switches 185 and 195 are controlled by modem 140 and host controller 150, respectively. Alternatively, as shown in FIG. 1B, switch 185 may be controlled by communication power manager 160, where power manager 160 receives its commands from modem 140.

Switch 195 is generally present on host devices 120 and not on jacket devices, since host devices operate in standalone mode independently of communication card 110, whereas jacket devices do not operate in standalone mode.

Circuit 100 provides simultaneous and non-simultaneous power on/off control. Use of switch 185 to turn host 120 on or off, does not affect regular operation of communication card 110 and, vice versa, use of switch 195 to turn communication card 110 on or off, does not affect regular operation of host 120.

Specifically, when operating alone, communication card 110 is turned on and off by button 180. When button 180 is pressed to turn on communication card 110, a wakeup event is detected in its power management system 160. When communication card 110 is attached to host 120, button 180 is generally physically inaccessible, and communication card 110 can only be turned on simultaneously with host 120, via switch 185 using the internal watchdog timer, button 190 or switch 195.

Similarly, when operating alone, host 120 is turned on and off by button 190. When button 190 is pressed to turn on host 120, a wakeup event is detected in its power management system 170. When communication card 110 is attached to host 120, host 120 can be turned on asynchronously by button 190, and can also be turned on synchronously with communication card 110, via switch 185.

If device 120 is a jacket device, instead of a host device, communication card 110 is turned on and off via switch 195 on jacket 120, which generates a wakeup event for power management system 160.

Power off events are generally reported to modem 140 and to host controller 150 before each respective device is turned off. In an embodiment of the present invention, when button 190 is used to turn off one or both of communication card 110 and host 120, button 190 must be pressed for a long press. The time duration of a press of button 190 is calculated in software, by host controller 150, generally via telemetries that controller 150 receives from host power manager 170.

Similarly, when communication card 110 is not attached to host 120, button 180 is accessible, and may be used to turn communication card 110 on and off. The time duration of a press of button 180 is calculated in software, by card modem 140, generally via telemetries that modem 140 receives from host power manager 160.

TABLE I summarizes an embodiment of simultaneous and non-simultaneous power on/off control enabled by button 190, and switches 185 and 195, when communication card 110 is attached to host 120.

TABLE I

Power on/off control when communication card 110 is attached to host 120

| Before wakeup/shutdown event | | | After wakeup/shutdown event | |
| --- | --- | --- | --- | --- |
| Host (120) State | Communication card (110) state | Wakeup/shutdown event | Host (120) State | Communication card (110) state |
| Off | Off | Button 190 pushed | On | On |
| On | Off | Switch 195 activated | On | On |
| | | Button 190 pushed | Off | Off |
| Off | On | Button 190 pushed | On | On |
| On | On | Switch 195 activated | On | Off |
| | | Button 190 pushed | Off | Off |

TABLE I indicates that when switch 195 is activated to turn off communication card 110, host device 120 remains on. In such case host device 120 turns itself off in a different manner, as appropriate, not using switch 195.

Circuit 100 uses voltage level shifter 125 to manage the potential voltage gap between I/Os of the two devices.

An advantage of circuit 100 is that it uses a single line of a connector between communication card 110 and jacket/host 120, for carrying wakeup signals.

In reading the above description, persons skilled in the art will realize that there are many apparent variations that can be applied to the circuit described. In particular, it will be appreciated that some power management systems have two input signals for waking up a device. In such case, the on/off button of a device may be connected to one of its power management inputs, with the other power management input being used for a remote wakeup signal coming from another device.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. An electrical circuit for bi-directional power control between two devices, comprising:
   a first battery-operated device, comprising:
      a first battery operative to provide a source of power to the first device;
      a first power management subsystem connected to said first battery, operative to power on components of the first device in response to occurrence of an event to wake up the first device; and
      a first on/off button operative to generate an event to wake up the first device;
   a second battery-operated device, comprising:
      a second battery operative to provide a source of power to the second device;
      a second power management subsystem connected to said second battery, operative to power on components of the second device in response to occurrence of an event to wake up the second device;
      a second on/off button operative to generate an event to wake up the second device; and
      a switch operative to automatically generate an event to wake up the first device, in response to said second on/off button generating an event to wake up the second device; and
   circuitry comprising a single connection line inter-connecting said first power management subsystem, said first on/off button, said second power management subsystem, said second on/off button, and said switch.

2. The circuit of claim 1 wherein said second device remains operational when said first device is powered off.

3. The circuit of claim 1 wherein said first device further comprises a switch operative to automatically generate an event to wake up the second device, in response to said first on/off button generating an event to wake up the first device, and wherein said single connection line also inter-connects said second device switch with said first and said second power management subsystems, said first and said second on/off buttons, and said first device switch.

4. The circuit of claim 1 wherein said first device further comprises a voltage level shifter operative to shift an I/O level of said first device to a voltage level of its battery.

5. An electrical circuit for bi-directional power control between two devices, comprising:
   a mobile communication card;
   an electronic device that connects to said communication card, the electronic device being either (i) a host device that operates independently of said communication card and also interoperates with said communication card, or (ii) a jacket for said communication card, wherein the jacket is a passive device that does not operate independently of said communication card; and
   circuitry connecting said mobile communication card with said electronic device, comprising:
      a card on/off button operative to power said mobile communication card on and off;
      a device on/off button operative to power said electronic device on and off; and
      a switch,
   wherein said circuitry uses a single connection line connecting said communication card, said electronic device, said card on/off button, said device on/off button, and said switch, to enable (i) said card on/off button to power said communication card on and off, (ii) said device on/off button to power said electronic device on and off, and (iii) said electronic device to automatically power said communication card on and off using said switch, in response to said electronic device being respectively powered on and off.

6. The circuit of claim 5 wherein said communication card comprises a card power management subsystem that powers said communication card on in response to a card wakeup event, and wherein said electronic device comprises a device power management subsystem that powers said electronic device on in response to a device wakeup event.

7. The circuit of claim 5 further comprising an auxiliary switch, and wherein said circuitry also uses the single connection line to enable (iv) said communication card to automatically power said electronic device on and off using said auxiliary switch, in response to said communication card being respectively powered on and off.

8. An electrical circuit for bi-directional power control between two devices, comprising:
   a first electronic device, comprising:
      a first power management subsystem, operative to power on components of the first device in response to occurrence of an event to wake up the first device; and
      a first switch operative to generate an event to wake up a second electronic device;
   a second electronic device, comprising:
      a second power management subsystem, operative to power on components of the second device in response to occurrence of an event to wake up the second device; and
      a second switch operative to generate an event to wake up the first device; and
   circuitry inter-connecting said first power management subsystem, said first switch, said second power management subsystem, and said second switch.

9. The circuit of claim 8 wherein said first electronic device further comprises a timer, operative to activate said first switch after lapse of a predetermined period of time.

10. The circuit of claim 8 wherein said second electronic device is a communication card.

11. The circuit of claim 10 wherein said first electronic device is a host device that operates independently of said communication card and also interoperates with said communication card.

12. The circuit of claim 10 wherein said first electronic device is a jacket for said communication card, wherein the jacket is a passive device that does not operate independently of said communication card.

* * * * *